United States Patent [19]

Barnett et al.

[11] Patent Number: 4,873,718

[45] Date of Patent: Oct. 10, 1989

[54] FEATURE TELEPHONE INTEGRATION DEVICE

[75] Inventors: Paul M. Barnett, Sunnyvale; Douglas A. Welch, San Jose; Duncan J. MacMillan, Jr., Los Altos, all of Calif.

[73] Assignee: Octel Communications Corp., Milpitas, Calif.

[21] Appl. No.: 275,659

[22] Filed: Nov. 22, 1988

Related U.S. Application Data

[63] Continuation of Ser. No. 74,532, Jul. 16, 1987, abandoned.

[51] Int. Cl.⁴ .................... H04M 1/64; H04M 11/00
[52] U.S. Cl. .................................... 379/156; 379/165
[58] Field of Search ............... 379/112, 156, 157, 165, 379/164

[56] References Cited

U.S. PATENT DOCUMENTS

| 3,794,774 | 2/1974 | Kemmerly et al. | 179/81 R |
| 4,685,121 | 8/1987 | Sanglier | 379/165 |
| 4,763,353 | 8/1988 | Canale et al. | 379/157 |

Primary Examiner—Stafford D. Schreyer
Attorney, Agent, or Firm—Flehr, Hohbach, Test, Albritton & Herbert

[57] ABSTRACT

A feature telephone integration device is disclosed. The device is intended for use in a PBX-type environment for use in a telephone system. The present invention uses communications with a feature phone as the source of information for an applications processor.

6 Claims, 2 Drawing Sheets

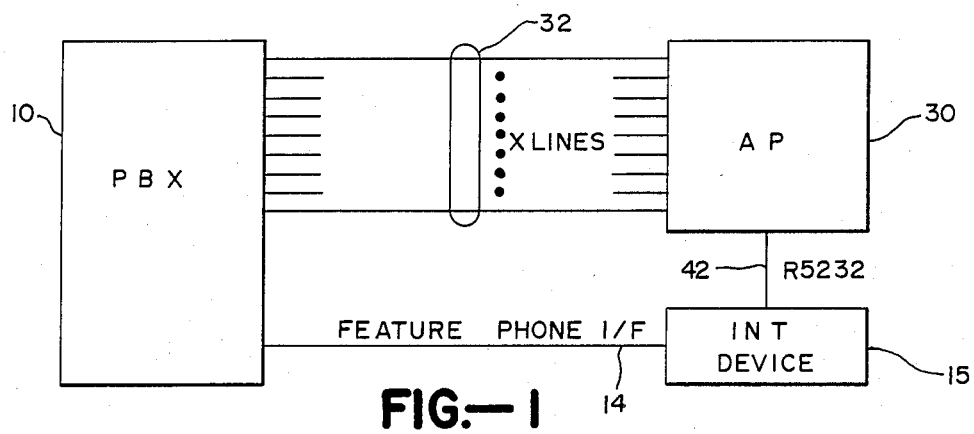
FIG.—1
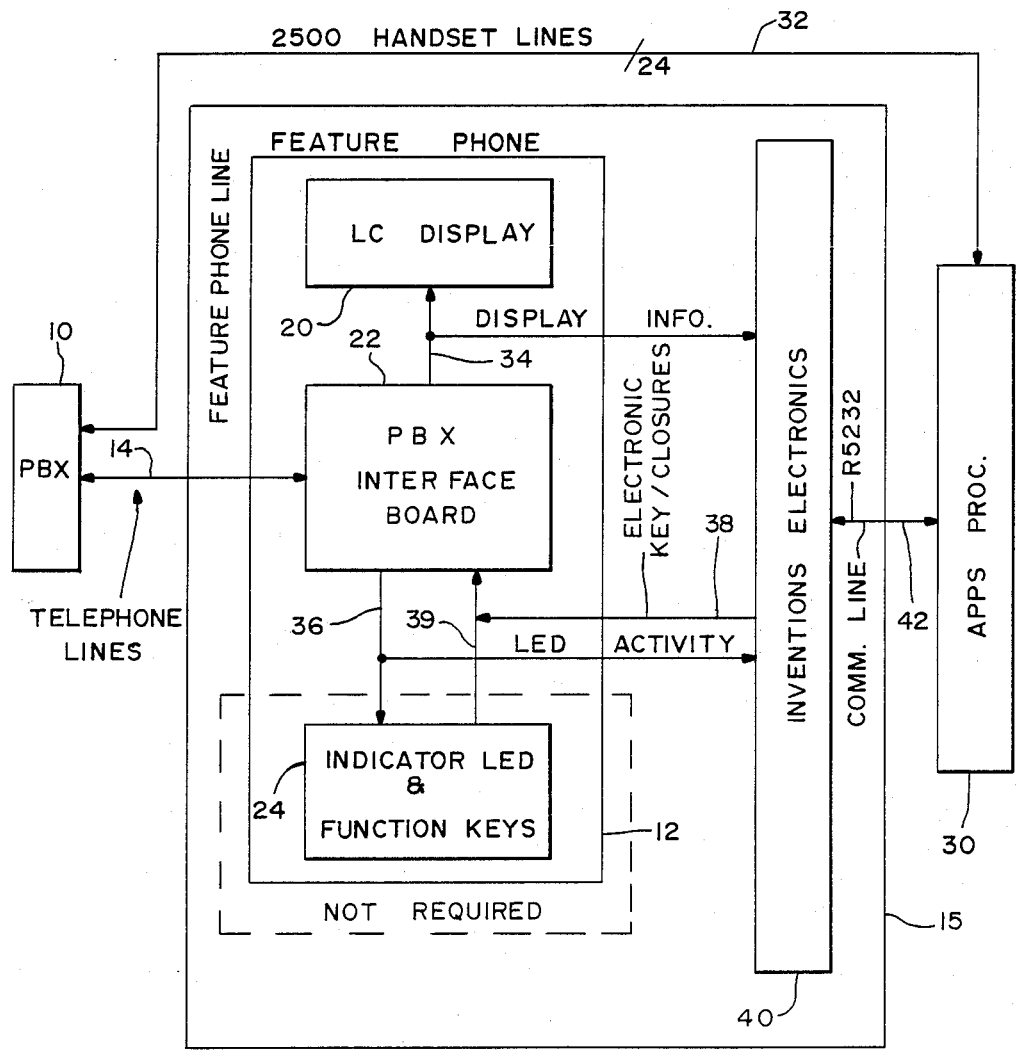
FIG.—2

FEATURE TELEPHONE INTEGRATION DEVICE

This is a continuation of application Ser. No. 074,532, filed 7/16/87, now abandoned.

BACKGROUND OF THE INVENTION

The present invention relates to a telephone communication system, and more particularly to a feature telephone integration device for utilization in a PBX (Private Branch Exchange) environment.

PBX systems are, of course, well known in the prior art. Communications are established between any external device (such as, but not limited to, a voice processing system) and a PBX system. Operation of external systems, often called applications processors, is enhanced when information from the PBX system is passed to the applications processor prior to, concurrent with or following a telephone call. Applications processors add features and functionality to a computer or telephone system.

Some of the functions an applications processor might add are automatic call distribution (ACD), voice mail, call detail recording, and so on.

An applications processor often acts like one or more telephone extensions to the PBX system. Calls terminate on the applications processor for several reasons, including, for example, when calls are placed directly to the applications processor, when calls are forwarded from an internal extension to the applications processor, when calls are forwarded from an internal extension to another extension and then to the applications processor, and when calls are forwarded from a trunk group to the applications processor.

Calls which are forwarded from an extension or trunk group to the applications processor may have been forwarded because of a busy condition, ring-no-answer condition, or other condition (such as "do not disturb").

An applications processor may handle a telephone call more efficiently if it knows why the call came to it in the first place. The ability of an applications processor to communicate with the PBX or computer system is often called integration. The mechanism or device which would enable this information to be passed to the applications processor would greatly enhance the value of the applications processor.

SUMMARY OF THE INVENTION

It is an object of the present invention to provide a feature telephone integration device for use in a PBX environment.

Many PBX systems have feature telephones (also called feature phones or executive phones) which provide a great deal of information to the user of the telephone system. Some or all of the information required by an applications processor for integration, as described above, is passed by the PBX to its own feature phone. In most cases, the feature phones are proprietary devices designed and manufactured by the maker of the particular PBX. In some approaches, it has been possible to provide a complete emulation of the feature phone in order to accomplish integration.

The present invention provides a device which uses the communications with a feature phone as the source of information for an applications processor. The present invention does not emulate a feature phone, but rather connects to the internal circuitry of a feature phone and monitors communications within the telephone itself, from the PBX, or other, which post information required on various displays of the feature phone.

The present invention includes a feature telephone set, an applications processor, a PBX system, an integration means for monitoring telephone communications between the applications processor, the feature telephone set and the PBX to determine the nature or type of the telephone communications. The apparatus further includes means for informing the applications processor of the specific nature or type of the telephone communications.

The present invention is thus able to monitor situations such as where all characters are passed to a visual display on a feature phone, such as liquid crystal displays (LCDs), light emitting diodes (LEDs) and other indicators on the feature phone. The present invention is also able to electronically "depress" any key on the feature phone, which then causes the PBX to take certain specific actions.

Other objects, features and advantages of the present invention will become apparent from the following detailed description when taken in conjunction with the accompanying drawings.

BRIEF DESCRIPTION OF THE DRAWINGS

FIG. 1 depicts a block diagram of a telephone system incorporating the present invention.

FIG. 2 depicts a block diagram of a feature telephone integration device according to the present invention.

DETAILED DESCRIPTION OF THE DRAWINGS

Figure 3:
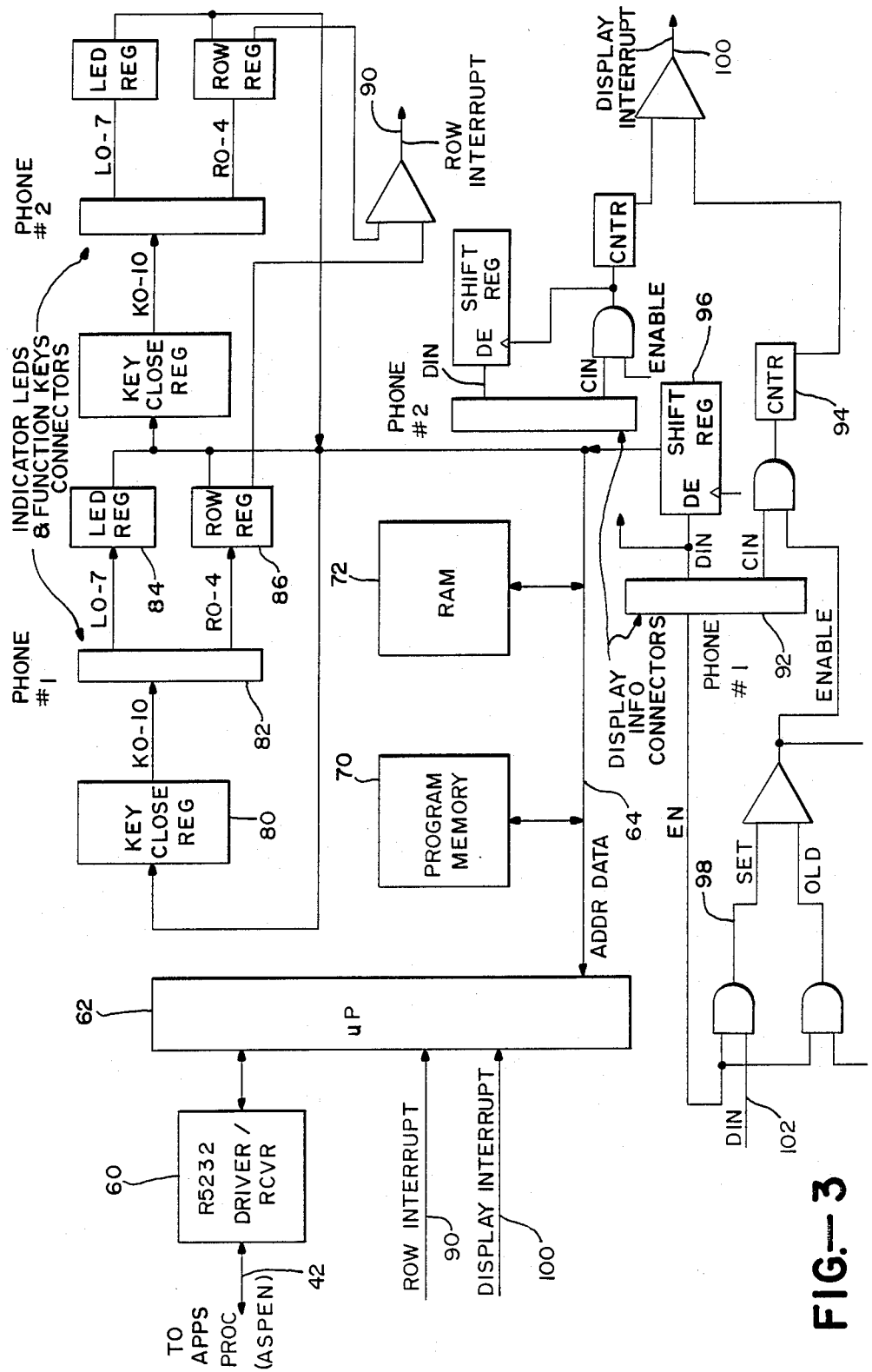
FIG. 3 depicts a more detailed description of the integration device of FIG. 2.

Referring now to FIG. 1, a block diagram of a telephone system which utilizes a feature telephone integration device according to the present invention is depicted.

In FIG. 1, the telephone system includes a conventional PBX 10 which is connected to an applications processor (AP) 30 via lines or leads 32. PBX 10 is also connected to an integration device 15 via lead 14. Device 15 is connected to AP 30 via lead 42, which is a conventional RS232 interface. A more detailed diagram of the present invention is depicted in FIG. 2.

In FIG. 2, the system includes a PBX (Private Branch Exchange) 10 connected to a suitable feature phone 12 via suitable telephone lead 14. The feature phone 12, connected to a suitable PBX, could be any one of various models available such as through Rolm Corporation, AT&T and the like. The feature phone telephone 12 includes a display 20 and indicator LEDs and function keys 24, both of which are connected to a PBX interface board 22.

The interface board 22 is connected to telephone lead 14 for establishing communications between PBX 10 and feature phone 12.

PBX interface board 22 connects to LC display 20 via lead 34. PBX interface board 22 also connects to indicator LEDs and function keys 24 via leads 36, 39.

The system depicted in FIG. 2 also includes an applications processor 30 which is connected to PBX 10 via telephone connection 32 which typically has twenty-four connections. Applications processor 30 could be any of any well known applications processors available, such as a commercially available processor manufactured by Octel Communications Corporation (known as "Aspen").

The system depicted in FIG. 2 also includes an integration device 40, which is interconnected to applications processor 30 via communication line 42 for communicating in an RS232 format.

The integration device 40 also provides connection to feature phone 12 via lead 34 for receiving display information going to LC display 20.

The integration device 40 also is connected to receive LED activity signals on lead 36 and provide electronic key/closure signals on lead 38. The integration device 40 is able to monitor communications with the feature telephone 12, and in addition is able to electronically "depress" any key on the feature telephone which causes PBX 10 to take certain predetermined actions.

FIG. 3 depicts a more detailed diagram of integration device 40 of FIG. 2.

In FIG. 3, lead 42 corresponds to the same lead 42 in FIG. 2 for communicating with the applications processor 30 of FIG. 2. The RS232 formatted information is transmitted via a suitable driver/receiver circuit 60, which is connected to a microprocessor 62.

Microprocessor 62 provides for interconnection to the other components of FIG. 3 by a suitable address/data bus 64. Other components in FIG. 3 include a program memory 70 and a suitable random access memory (RAM) 72 interconnected to bus 64.

Also included in FIG. 3 are indicator LEDs and function key connectors such as circuit 82. The components in FIG. 3 are configured for separate telephone connections and thus there is a redundancy for the respective telephone connections. However, in order to understand the aspects of the present invention, only the components for a separate telephone connection need be described.

Each circuit 82 is connected to receive information via a key close register such as register 80. Each circuit 82 provides LED information for LED register 84, and row information for register 86.

A row interrupt signal is generated on lead 90. In order to provide suitable display information and control signals, a display interrupt signal is generated on lead 100 via the interconnections of logic circuit 98, display information connectors 92, shift register 96 and counter 94.

As can be seen in FIG. 3, each redundant configuration is provided for separate telephone connections, as described above.

In a preferred embodiment, the feature phone such as manufactured by Rolm Corporation is suitably interconnected with the integration device 40 of FIG. 3. However, it should be understood that the aspects of the present invention can be applied to any feature telephone, in general.

The present invention has the ability to request that a telephone line on the applications processor 30 of FIG. 2 be reserved. The present invention monitors the communications from PBX 10 to feature phone 12 to provide the necessary integration information of each call for the applications processor 30.

The present invention will electronically "see" an LED flashing, and electronically push the corresponding button for that line appearance. This is controlled by the signals on leads 36 and 38, depicted in FIG. 2.

When a feature phone answers any line, PBX 10 will send characters to it corresponding to all activity relating to the call, such as the source of the call, reason for the call, and the like. The present invention monitors all of this communication with the display 20 of FIG. 2.

The present invention may employ additional feature phones for the purpose of illuminating or de-illuminating message waiting indicators. A feature phone has the capability of pushing a button, dialing an extension number and determining whether or not a message waiting light is illuminated for any extension in the system. The present invention electronically accomplishes this task using feature phone functions.

Since illuminating and de-illuminating message waiting indicators may be an intensive task, the present invention may employ a separate feature phone.

In order to more clearly explain the aspects of the present invention, two specific examples of incoming calls will now be described in conjunction with the present invention depicted in FIGS. 1–3.

A first type of incoming call could be a normal subscriber access call. In that type of operation, there is a set of line appearances, which are telephone line appearances reserved on the feature phone table, which is a table created within the software of the PBX 10. The table indicates where all of the telephone line appearances are.

The present invention "looks" at the LED indicators 12 in FIG. 2 to see if someone is calling one of those lines.

This is accomplished by reading lead 36, which is the LED activity line, which indicates some form of flashing when a telephone call is incoming.

Before the call is actually answered, the invention "crosses" interface 42 and talks to the application processor 30 to ask for a telephone line, and if available, to reserve that telephone line.

When the telephone line is available, the present invention answers the call and reads the display information on LC display 20.

The present invention answers the call by indicating a key closure to the switch via a signal on electronic key closure lead 38 of FIG. 2, which then answers the call. This simulates the answering just like a normal person would. The outside caller is connected to the telephone itself.

The invention then processes the display information from display 20 through lead 34 to determine the kind of call which is incoming. This would determine whether it is an inside call, what the extension number is, and so forth.

Once the display information is processed, the present invention uses a feature within PBX 10 which is known as "Park." The present invention "depresses" a function key on indicator 24 of FIG. 2 and dials the extension number of the port in the applications processor 30 that has been reserved.

When this happens, the caller is rerouted to a port on applications processor 30 which sends a message across interface 42 which gives incoming call information about the person that is calling and which port the call is on.

The applications processor will go off hook on that port, dial a connect feature code, which will cut a voice path through from the caller to the applications processor 30. After that message is sent out, the present invention takes no further action in connection with the telephone interface.

Another type of operation utilizes an operator to transfer the call into the applications processor 30. There is another set of line appearances typically available which is different than one in which a normal subscriber is calling on or being forwarded to.

The present invention monitors this type of activity through the LED indicator line 36 and checks to determine if it is ringing, as in normal operation.

The present invention then reserves a port on the applications processor 30 through the message to interface 42.

Once the reserve message is received, the present invention sends another message to the applications processor 30 to identify which extension number should be "picked." The call that is ringing on the present invention is "picked" by applications processor 30, using the port that was reserved.

If there is a message waiting for a user, the applications processor sends a message to the present invention across interface 42 to tell which extension is desired for a message. The present invention will "electronically depress" the appropriate key on indicator 24 for that particular line appearance on which there is a message waiting line.

The present invention "reads" the LED activity to make sure that there is a dial tone on the line, then depresses a message waiting key, which is on typical type feature phones, dials the extension number of the person desired, reads the LED activity to see whether or not it is already set or cleared, and changes if need be through the key closures to complete the operation.

The present invention is a device which uses the communications with a feature phone as the source of information for an applications processor. The device does not emulate a feature phone but rather connects to the internal circuitry of the feature phone and monitors communications within the telephone to it from the PBX, or other, which post information required on various displays of feature phone 12.

The present invention is thus able to monitor all characters passed to the visual display on a feature phone, all LCDs, LEDs and other indicators on a feature phone. The present invention is also able to electronically depress any key on the feature phone which then causes the PBX to take certain actions.

What is claimed is:

1. Feature telephone integration apparatus comprising
    a feature telephone set,
    an applications processor,
    a PBX,
    integration means for monitoring telephone communications between said applications processor, said feature telephone set and said PBX in order to determine the nature or type of said telephone communications, and
    means for informing said applications processor of the nature or type of said telephone communications.

2. The apparatus as in claim 1 wherein said feature telephone set includes a display for visually displaying received characters and wherein said integration means includes means for monitoring said displayed characters.

3. The apparatus as in claim 2 wherein said feature telephone set includes a plurality of function keys and wherein said integration means includes means for electronically initiating actuation of any one of said function keys on said telephone set so as to cause said PBX to take a specified action.

4. Feature telephone integration apparatus comprising
    a telephone set having feature telephone functions,
    an applications processor,
    a switching means, and an
    integration means for monitoring telephone communications between said applications processor, said telephone set and said switching means in order to determine the nature or type of said telephone communications.

5. The apparatus as in claim 4 wherein said telephone set includes a display for visually displaying received characters and wherein said integration means includes means for monitoring said displayed characters.

6. The apparatus as in claim 5 wherein said telephone set includes a plurality of function keys and wherein said integration means include means for electronically simulating actuation of any one of said keys on said telephone set so as to cause said switching means to take a specified action.

* * * * *